United States Patent [19]
Yates

[11] 3,888,788
[45] June 10, 1975

[54] PREPARATION OF STANNIC OXIDE AQUASOLS AND ORGANOSOLS

[75] Inventor: Paul Clifford Yates, Wilmington, Del.

[73] Assignee: E. I. du Pont de Nemours & Company, Wilmington, Del.

[22] Filed: Nov. 2, 1972

[21] Appl. No.: 303,208

Related U.S. Application Data

[63] Continuation-in-part of Ser. No. 93,862, Nov. 30, 1970, abandoned.

[52] U.S. Cl............... 252/309; 252/8.1; 252/313 R; 260/37 N; 260/42.54
[51] Int. Cl............................................. B01j 13/00
[58] Field of Search.................... 252/313 R, 309

[56] References Cited
UNITED STATES PATENTS

| | | | |
|---|---|---|---|
| 2,285,477 | 6/1942 | White | 252/313 P |
| 3,455,794 | 7/1969 | Passal et al. | 252/313 R X |

FOREIGN PATENTS OR APPLICATIONS

| | | | |
|---|---|---|---|
| 976,328 | 11/1964 | United Kingdom | 252/313 R |

*Primary Examiner*—Richard D. Lovering

[57] ABSTRACT

Stannic oxide aquasols are made by deionizing an aqueous solution of a salt of the metal. Stannic oxide organosols in polar organic liquids having a boiling point above that of water are made by adding the organic liquid to an aquasol prepared as described above, then vacuum distilling to remove the water. The aquasol can be heated if desired to increase particle size. Aquasols and organosols in liquids which dissolve polymers (e.g. dimethylformamide) are used to incorporate stannic oxide into polymeric articles such as fibers and films.

13 Claims, No Drawings

PREPARATION OF STANNIC OXIDE AQUASOLS AND ORGANOSOLS

CROSS REFERENCE TO RELATED APPLICATION

This application is a continuation-in-part of application Serial No. 93,862, filed November 30, 1970 and assigned to the assignee of the present application, now abandoned.

BACKGROUND OF THE INVENTION

The prior art is familiar with techniques for preparing stannic oxide sols, either positively or negatively charged. For example, a number are discussed in chapter 8 of the book entitled "Inorganic Colloid Chemistry" by Harry Weiser, Vol. 2, "The Hydrous Oxides and Hydroxides," published by John Wiley & Sons, Inc., New York, 1935.

Techniques mentioned in this chapter include the precipitation from soluble stannic salts such as stannic chloride, of a stannic hydroxide gel by addition of bases such as sodium hydroxide or carbonate, ammonium hydroxide or carbonate, barium hydroxide, calcium hydroxide, and the like. Upon washing or dialyzing this freshly precipitated hydroxide, it is possible to prepare colloidal hydrated stannic oxide. This can also be done by dialyzing a partially neutralized solution such as stannic chloride. Stannic hydroxide may also be prepared by the neutralization of alkali metal stannates with a dilute solution of a mineral acid, and washing the salts from the freshly precipitated product. Negatively charged colloidal suspensions of stannic oxide may be prepared by partial neutralization of the metal stannate leaving some unneutralized alkali metal hydroxides as stabilizing agents for the dispersion.

As indicated by the discussion in this chapter, materials prepared by such procedures can vary widely in their character, depending upon the temperature of precipitation, the degree of washing, the particular starting salt employed, and whether or not the product is stabilized by an excess of unneutralized acid or an excess of unneutralized base. The length of aging of a precipitant before peptizing it is also important in determining the characteristics of the end product.

While such procedures give useful results in a number of instances the products are often aggregated or are of large particle size. Exhaustive purification procedures are required along with care to avoid overheating the product or aging it too long, to obtain small particle size, nonaggregated, stable colloidal dispersions. Prior art procedures are expensive, since they involve handling a gelatinous, slowly filterable material, and contacting it either by dialysis or washing with very large quantities of purified water. In addition, as pointed out in the reference chapter, and negatively charged colloidal oxides of the prior art, usually prepared from alkali metal stannates, are precipitated by organic liquids, and cannot be transferred into organic liquids.

This is also true of U.S. Pat. No. 3,455,794, which employs a cation exchange resin to partially remove sodium ions from sodium stannate and prepare a negatively charged stannic oxide sol stabilized by a substantial retained proportion of sodium oxide. While the sols of this patent are well suited for the purposes for which they are intended, namely to replace the tin values in aqueous alkali plating baths, they are unstable when mixed with organic liquids and can therefore not be used to make organosols as can the aquasols made by the process of this invention.

British Pat. Specification No. 976,328 discusses the preparation of several metal oxide sols by ion exchange techniques, and recommends a pH of 3 to 7 when the solubilizing ion is anionic. Although examples are given for the production of sols of lead oxide, chromia, calcium hydroxide, $NiO.Fe_2O_3$, $WO_3$, $BaO.Fe_2O_3$, $Al_2O_3$, and $Gd_2O_3$, no examples or operating conditions specific to stannic oxide are given.

SUMMARY OF THE INVENTION

This invention provides a process for making aquasols and organosols composed of positively charged colloidal particles of stannic oxide. The aqueous sols can be imbibed into swollen organic fibers such as cellulose fibers to provide flame-resistant fibers. The aqueous sols are used to prepare the organosols. When the organosol is prepared in a liquid which will dissolve a synthetic organic polymer, the resulting sol can be used to incorporate the stannic oxide into the polymer before it is shaped into an article. For example, a polymer of acrylonitrile can be dissolved in a sol of stannic oxide in dimethylformamide, and the solution can be dry-spun in conventional manner to provide flame-resistant fibers.

The process of this invention for making aquasols comprises deionizing an aqueous solution of a soluble salt of $Sn^{+4}$ with an anion exchange resin in the hydroxyl form until the cation-to-anion molar ratio is between about 0.5:1 and 5:1. The organosols are prepared from the aquasols by mixing the aquasols with a polar, hydrogen-bonding organic liquid having a boiling point above that of water, or which forms an azeotrope with water which boils below the boiling point of the organic liquid, then vacuum distilling the water or azeotrope until the water concentration in the remaining organosol is less than about 1% by weight.

Thus, according to this invention, aquasols and organosols of stannic oxide can be very quickly prepared without excessive washing, dialysis or handling of gelatinous difficult-to-wash precipitants. They can be prepared in very high concentration. The anion exchange resin employed in the process of the invention can be regenerated after use by contacting with base, and reused repeatedly to prepare additional stannic oxide sols.

The positively charged aquasols of this invention are compatible with a variety of organic solvents and can be quickly transferred into them by distillation. Since the processes of the invention can operate at room temperature, or any desired temperature up to the boiling point of water or even higher if it is desired to operate under pressure, particle size is easily controlled by varying the temperature at which the deionization process occurs or by subsequently heating the aquasol if it is desired to grow the particles.

The colloidal particles do not become aggregated during the process of this invention so it is not necessary to operate quickly to avoid cemented aggregation and particle growth as with procedures of the prior art.

DETAILS OF THE INVENTION

The preparation of stannic oxide aquasols involves deionizing an aqueous solution of a water-soluble salt of $Sn^{+4}$. Suitable salts include the chloride, bromide, formate, acetate, nitrate, cyanate and thiocyanate of $Sn^{+4}$.

The deionization is accomplished by treatment with an anion-exchange resin in the hydroxyl form. These are known materials, and are described, e.g. in *Ion Exchange Resins* by Robert Kunin, 2nd Ed., John Wiley and Sons, Inc., New York.

The salt is dissolved in water and the ion exchange resin is slurried with the aqueous solution in sufficient quantity to remove the desired amount of the anion. Deionization should be continued until the cation-to-anion ratio is between about 0.5:1 and 5:1, preferably between 1 and 5:1.

Before the anion exchange, the solution of a tetravalent tin salt, such as $SnCl_4$, has a cation-to-anion ratio of 0.25:1. $SnCl_3$ would give a ratio of 0.33:1. Films of polyacrylonitrile have been made with sols of $Sn^{+4}$ salts having a cation-to-anion ratio of 0.25:1 and 0.33:1, and they were badly delustered and opaque. Films otherwise equivalent but made according to the present invention with a ratio of 0.54:1 were clear. Thus the lower limit of a ratio of about 0.5:1 is established.

At the other end of the scale, it has been found that removal of all the anion content will lead to instability of the sol with particle agglomeration and gelling. In fact, a cation-to-anion ratio of more than about 5:1 leads to gelling and aggregation. Such products cannot be used successfully in organic polymers.

Also, the pH of the sol should be kept below about 1.5 to avoid gellation and aggregation.

The aquasol produced in this first step is composed of spheroidal metal oxide particles having an average diameter between about 2 and 50 millimicrons. Metal oxide concentration is between about 1 an 40%. If desired, the sol can be heated to grow the particles. Particles having an average diameter of 200 millimicrons or greater can be obtained by heating. The first step in converting an aquasol into an organosol is to add the organic liquid to the aquasol. The amount of liquid should be sufficient to provide a final organosol with a concentration in the range of about 2 to 25% by weight. More dilute sols can of course by made, but are not economically practical.

After adding the organic liquid the water is removed from the sol by distillation, preferably under vacuum in order to minimize the temperature required and avoid particle growth.

The organic liquid used, of course, must be higher boiling than water, preferably at least 10°C. higher, or it must form an azeotrope with water which boils at least 10°C. below the boiling point of the solvent, so that the water can be easily removed by distillation. The liquid must also be sufficiently polar to allow the anions to stabilize the positively charged sol particles; thus the dielectric constant of the liquid should be greater than about 10. The liquid used must also be miscible with water in all proportions to avoid the formation of immiscible phases during the distillation transfer of the sol into the organic phase. The preferred liquids are those which are good solvents for organic polymers used for films and fibers. Especially preferred are formamide, dimethylformamide, dimethylsulfoxide, tetramethylurea, formic acid, acetamide and dimethylacetamide.

The process of the invention is illustrated by the following representative examples, wherein parts and percentages are by weight unless otherwise specified.

EXAMPLE 1

Two hundred twenty-five grams of stannic chloride pentahydrate are dissolved in water and diluted to a 1 liter volume. One thousand grams of the hydroxyl form of a strong base ion exchange resin are then added slowly, with stirring. The strong base anion exchange resin is a polymer of styrene crosslinked with small amounts of divinyl benzene containing quaternary ammonium functional groups as the active ion exchange site. The ion exchange capacity is approximately one milliequivalent per gram of wet resin. After treating with the ion exchange resin for 10 minutes, the solution is filtered to separate it from the resin and is allowed to stand for 14 hours at room temperature. It is then treated with 500 grams additional resin with the treatment time being approximately 5 minutes. It is then filtered and 1000 mls. of solution are recovered. This is mixed in a high speed blender with an equal volume of dimethylformamide. It is placed in a 5 liter flask and heated under vacuum from a water aspirator, which gives a vacuum of approximately 10 microns. It is distilled, with the starting temperature being about 35°C., and additional dimethylformamide is added until substantially all of the water is removed. The temperature at the end of this operation is 80°C.

The clear, colloidal solution of stannic oxide stabilized with chloride counterions is analyzed, and has a concentration of 5.49% stannic oxide, 1.75% chloride, and 0.54% water, corresponding to a cation/anion ratio of 0.73:1.

This material is mixed with polyacrylonitrile resin, which dissolves in the dimethylformamide solvent, in a quantity such that the loading of the stannic oxide based on the weight of the resin is 10%. This is cast as a film and spun into fibers. It is found that the flame retardance is substantially improved relative to an unmodified polyacrylonitrile control. Due to the small particle size of the oxide, no difficulty is experienced in spinning this fiber, due to pluggage of the spinnerette or of the filter packs. This is in contrast to experience with commercially available stannic oxide dispersions in water, where these large particles do plug filter packs and spinnerettes.

It is also mixed with a copolymer of 15% vinyl chloride with acrylonitrile, and again satisfactory fibers are spun with no difficulty. These materials exhibit a luster similar to those of control fabrics and increased flame resistance compared to the control fabrics.

EXAMPLE 2

Seven hundred grams of stannic chloride pentahydrate and 480 grams of anhydrous stannic chloride are added to 6,000 grams of water. Three thousand grams of an anion exchange resin of Example 1 are mixed with the stannic chloride-water solution and allowed to stir for 10 minutes. The resin is filtered off, and the pH is found to be 0.5 and the chloride is 1.65 molal. An additional 3,000 grams of the hydroxyl form of anion exchange resin is stirred for 10 minutes, and the solution filtered to separate it from the resin. The pH is now 1.1, and the chloride ion concentration is 1.01 molal. The solution is approximately 7,000 mls. in volume at this point. A third portion of 3,000 grams of ion exchange resin is allowed to stir for about 1 minute and it is observed that the sol is beginning to thicken. Therefore, 100 grams of concentrated hydrochloric acid is added. The resin is filtered off and the product is distilled under vacuum. It is, however, still found to be unduly thick, and so an additional 100 grams of 37% HCl is added. This converts the sol into a clear and very fluid material. This is concentrated under vacuum to a volume of 1,100 grams. Chemical analysis indicates the chloride concentration to be 4.83%, and the concentration of stannic oxide to be 28.06%. This sol is found to be stable for over 6 months at room temperature, with no evidence of increasing viscosity or turbidity. This material is an excellent flameproofing agent for cellulose fibers which swell when immersed in this material to imbibe substantial quantities of stannic oxide. Portions of this material are transferred by the technique of Example 1 into an equal volume of dimethylformamide in one case, and dimethylacetamide in a second, and incorporated into polymers which are soluble in such solvents, toi impart flameproofing characteristics. The ratio of $Sn^{+4}$ to $Cl^-$ in the aquasol and in the sols in dimethylformamide and dimethylacetamide is 1.38.

What is claimed is:

1. A method for making a positively charged stannic oxide aquasol which comprises deionizing an aqueous solution of a soluble salt of $Sn^{+4}$ with an anion exchange resin in the hydroxyl form until the cation-to-anion ratio is between about 0.5:1 and 5:1 and maintaining the pH below about 1.5.

2. Method of claim 1 wherein the solution salt of $Sn^{+4}$ is a member of the group consisting of the chloride, bromide, formate, acetate, nitrate, cyanate and thiocyanate salts.

3. Method of claim 2 wherein the deionizing is continued until the cation-to-anion ratio is between about 1:1 and 5:1.

4. Method of claim 3 wherein the soluble salt of $SN^{+4}$ is stannic chloride.

5. Method of claim 1 which comprises the further step of heating the aquasol in order to increase the stannic oxide particle size.

6. A method for making a positively charged stannic oxide organosol which comprises.
   a. deionizing an aqueous solution of a soluble of $Sn^{+4}$ with an anion exchange resin in the hydroxyl form until the cation to anion ratio is between about 0.5:1 and 5:1 to provide an anion-stabilized aquasol, while maintaining the pH below about 1.5,
   b. mixing the aquasol with a polar, hydrogenbonding organic liquid which has a boiling point above that of water or which forms a lower-boiling azeotrope with water; and
   c. removing the water by vacuum distillation until the water concentration in the remaining organosol is less than about 1% by weight.

7. Method of claim 6 wherein the polar organic liquid has a dielectric constant of at least 10 and is a good solvent for synthetic organic polymers used for fibers and films.

8. Method of claim 7 wherein the soluble salt of $Sn^{+4}$ is a member of the group consisting of the chloride, bromide, formate, acetate, nitrate, cyanate, and thiocyanate of $Sn^{+4}$.

9. Method of claim 8 wherein the deionizing is continued until the cation to anion ratio is between about 1:1 and 5:1.

10. Method of claim 9 wherein the soluble salt of $Sn^{+4}$ is stannic chloride.

11. Method of claim 10 wherein the polar organic liquid is a member of the group consisting of dimethylformamide, formamide, dimethylsulfoxide, dimethylacetamide, and tetramethylurea.

12. Method of claim 10 wherein the polar organic liquid is dimethylformamide.

13. Method of claim 6 wherein the aquasol is heated before step (b) in order to increase the stannic oxide particle size.

* * * * *